United States Patent [19]
Bricot et al.

[11] Patent Number: 4,535,431
[45] Date of Patent: Aug. 13, 1985

[54] OPTICAL TRACK FOLLOWER DEVICE WITH SAMPLING

[75] Inventors: Claude Bricot; Jean Louis Gérard; Michel Audoin, all of Paris, France

[73] Assignee: Thomson-CSF, Paris, France

[21] Appl. No.: 406,917

[22] Filed: Aug. 10, 1982

[30] Foreign Application Priority Data

Aug. 14, 1981 [FR] France ................. 81 15765

[51] Int. Cl.³ .................... G11B 7/00; G11B 21/10
[52] U.S. Cl. ...................................... 369/44; 230/202
[58] Field of Search ............... 369/44, 111, 124, 121, 369/122; 360/77; 250/202; 346/76 L

[56] References Cited

U.S. PATENT DOCUMENTS

| 3,530,321 | 9/1970 | Reitherman | 310/75 |
| 3,654,624 | 4/1972 | Becker | 346/76 L |
| 3,914,595 | 10/1975 | Linet | 250/202 |
| 3,919,697 | 11/1975 | Walker | 36/78 |
| 3,944,727 | 3/1976 | Elliott | 369/44 |
| 4,094,013 | 6/1978 | Hill | 360/77 |
| 4,198,657 | 4/1980 | Kanamaru | 250/202 |
| 4,205,338 | 5/1980 | Schaefer | 346/76 L |
| 4,275,275 | 6/1981 | Bricot | 346/76 L |
| 4,283,785 | 8/1981 | Miyouchi | 369/121 |
| 4,346,471 | 8/1982 | Hirasawa | 360/77 |
| 4,366,564 | 12/1982 | Hoan | 369/60 |
| 4,397,010 | 8/1983 | Nabeshima | 369/44 |

FOREIGN PATENT DOCUMENTS

| 11990 | 6/1980 | European Pat. Off. | 369/111 |
| 22682 | 1/1981 | European Pat. Off. | 369/45 |
| 35236 | 9/1981 | European Pat. Off. | 369/44 |
| 3020855 | 6/1979 | Fed. Rep. of Germany | 369/44 |
| 2260163 | 8/1975 | France | 369/111 |
| 2312087 | 12/1976 | France | 369/111 |
| 2312091 | 12/1976 | France | 369/111 |

OTHER PUBLICATIONS

Patent Abstracts of Japan, vol. 2, No. 64, 5/17/78, p. 2100E78.

Primary Examiner—Alan Faber
Attorney, Agent, or Firm—Cushman, Darby & Cushman

[57] ABSTRACT

The invention relates to devices for optically transcribing in a track carried by a support medium data to be written in or read out. The invention provides a pre-engraved track follower device for a transcription device in which a loop for radial control of the reading spot scanning the track is provided with sampling means taking samples during scanning of nonpost-engraved parts of a pre-engraved track, said scanning corresponding to a data write or read phase. The invention applies more particularly for digital data transcription devices using a single spot for locating a pre-engraved track and since optically writing data therein.

15 Claims, 8 Drawing Figures

OPTICAL TRACK FOLLOWER DEVICE WITH SAMPLING

BACKGROUND OF THE INVENTION

The present invention relates to optical signal transcription devices using an information support medium illuminated by a light spot for writing or reading digital data or similar along a pre-engraved track.

The disk-shaped support medium on which this information is to be written has been pre-engraved, for example in the form of a groove, with a set of track elements arranged in concentric circles or organized along the turns of a spiral. The width of the track elements is chosen slightly less than the diameter of the light spot and these elements are separated by inter-track areas whose width is slightly greater than this diameter. The relief surface of the support medium receives a thin layer appropriate to writing by thermo-optical means. This arrangement of elements allows the track to be scanned before writing, for interaction of the reading spot with the track causes a dispersed radiation of reduced intensity, whereas the inter-track areas do not generate any dispersion.

It is, from the detection point of view, as if the tracks were darker than the inter-tracks. Any deviation from following the track may then be easily detected because of this amplitude contrast. When the layer covering the support medium is subjected to the writing radiation, the written zones are illuminated, which contributes to creating a good contrast along the track. However, these illuminated zones tend to merge with the lower density of the adjacent intertracks, which causes the contrast to be lost radially which is required for good track following.

It can then be seen that writing adversely affects good radial location of the tracks in all the zones where the layer has stored data. On the other hand, the track-intertrack contrast remains good in the zones free from writing.

The above-mentioned device requires then that a track carried by the information support means be followed, the invention relates more particularly to the means for following said track. These means are used to ensure scanning of the track by means of the light spot and to this end they comprise optical detection of the deviations from track following and a reading spot displacement member actuated so as to compensate for the deviations.

An optical transcription devices usually comprises a radiation source, an optical modulating means with electrical control and means for allowing the track to be read or recorded to be followed. The radiation source provides a beam of sufficient strength for recording on the information support medium. The beam at the output of the optical modulating means is modulated in accordance with the signals to be written present at the input of the modulating means. The track following means comprise at least one detection means in which the radiation gives rise to a signal which acts on the beam deflector means for ensuring following of the track.

Scanning of the pre-engraved blank track raises no difficulties but it is different during writing and during reading taking place after the data have been written. In fact, when data are recorded, the intensity of illumination of the support medium changes value so that the radiation reflected or transmitted by the information support medium undergoes intensity modulation which does not exist in the reading mode. Writing takes place generally with beam intensities considerably higher than those required for reading, which causes a sudden variation in the gain of the feedback loop which controls following of the track. In addition, during these sudden changes in intensity level, transitory phenomena are created which lead to instabilities prejudicial to correct operation of the feed-back loop.

When recorded tracks are read, a series of illuminated zones are detected intersected by darker zones, but radially the track-intertrack contrast becomes uneven since only the unrecorded zones of the track have kept their initial contrast with respect to the intertracks.

The present invention aims at obviating these drawbacks by adopting a sampling technique making track following insensitive to the modulation of a writing beam.

SUMMARY OF THE INVENTION

The present invention provides a track following device for an optical signal transcription device associated with a pre-engraved information support medium, said transcription device comprising an optical radiation source associated with a lens for forming, in at least one reference surface of said support medium, at least one spot for scanning a track; an optical modulator being situated between said source and said lens; said following device comprising servo-control means ensuring that said track is followed by said spot and photodetector means collecting radiation emerging from the portion of said reference surface illuminated by said spot, wherein said following device comprises sampling means disposed at the output of said photodetecting means so as to take samples of the photodetected signal during time intervals corresponding to scanning of parts of said track having kept the optical characteristics of the pre-engraving; said samples being used by said servo-control means for providing said track following.

BRIEF DESCRIPTION OF THE DRAWINGS

The invention will be better understood from the following description and accompanying drawings in which.

DESCRIPTION OF THE PREFERRED EMBODIMENTS

Figure 1:
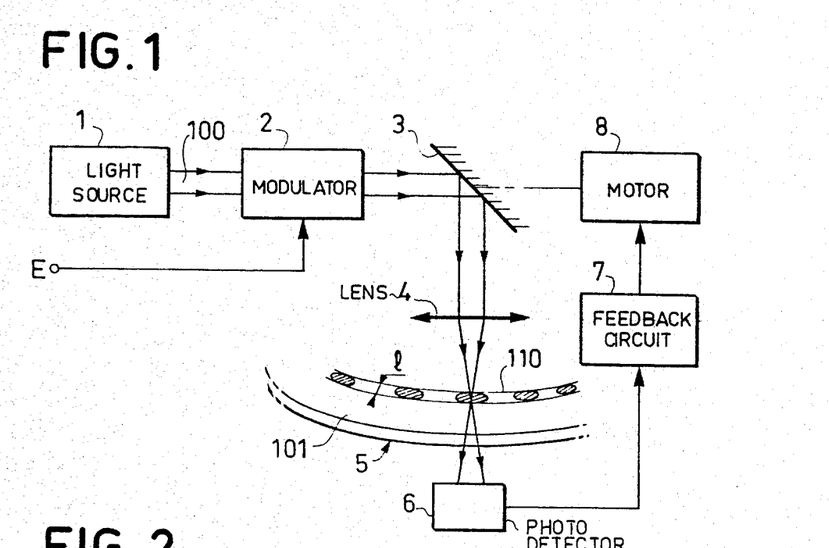
FIG. 1 shows a data transcription device with servo-controlled scanning of a track.

In FIG. 1 an optical transcription device can be seen with servo-controlled scanning in so far as track following is concerned. Beam 100 from a radiation source 1 passes through a modulator 2 and leaves therefrom modulated according to the signal to be transcribed present at the input terminal E. The beam is deflected by deflector means 3, such for example as a pivoting mirror, it is then focussed on a track of the information support medium 5 by means of a lens 4. The reference surface 101 containing the track is then illuminated by a light spot which extends for example over the width "1" of the track. After transmission or reflection, the radiation which interacted with the track is received by a photodetection means 6 from which is delivered a signal indicating the deviation from following the track by the light spot. This signal is processed by the servo-control circuit 7, a motor 8 connected to the output of the servo-control circuit 7 allows the orientation of the deflecting means 3 to be modified so as to ensure that the track is followed.

Originally, the information support medium 101 comprises pre-engraving for giving material form to the unrecorded track elements 110 disposed in concentric spirals. To write in the information, the light spot projected by lens 4 must follow a track element to form therein, thermo-optically, a series of permanent alterations. The arrangement of these alterations along the track element characterizes geometrically the two-level modulating signal which controls modulator 2. The light spot which has served for writing the information may then serve for detecting alterations in a reading phase where following of the track must again be ensured. The servo-control loop 7,8 which is charged with the track following is subjected to two types of disturbance. Some are observed during the writing phase, for the light intensity of the spot varies at the rhythm of the alterations to be created along the track. The others are observed during the reading phase, for the optical contrast is not the same depending on whether the spot scans a track portion altered by the writing or a track portion which has remained intact. The gain of the servo-control loop may then vary in magnitude and in sign and this defect may cause the servo-control to slip.

Figure 2:
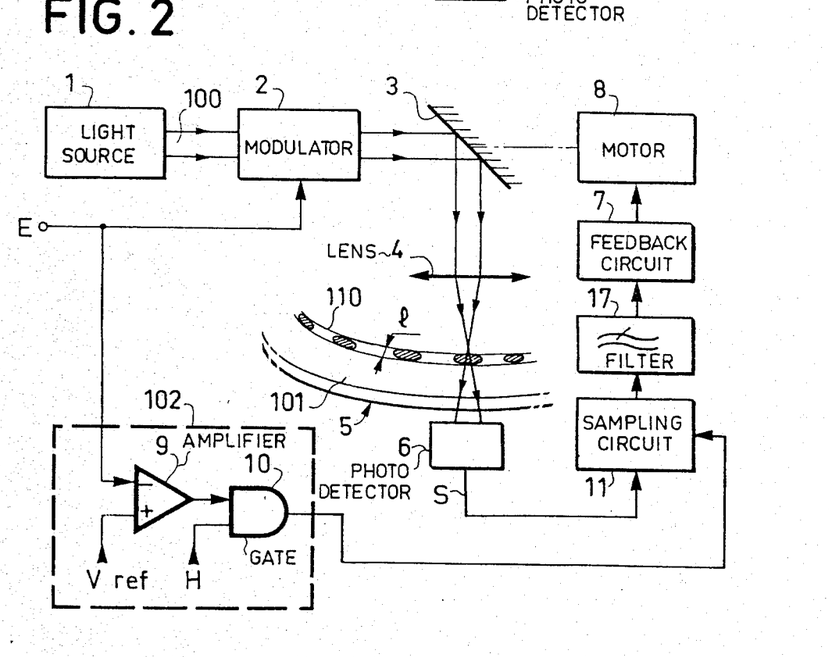
FIG. 2 shows a transcription device according to the invention.

FIG. 2 shows an optical transcription device in accordance with the invention. Beam 100 from the radiation source 1 passes through modulator 2, is deflected by the deflection means 3 and is focussed on the information support medium 5 by lens 4. The modulated beam, for example during transmission by support 5, gives rise in at least one photodetector means 6 to an electric signal S. According to the invention, sampling means 11 disposed at the output of the photodetector 6 takes samples of signal S and transmits them to the input of the servo-control circuit 7. The sampling means 11 take their samples during time intervals when the light intensity of the scanning spot of the track has a rest value corresponding to a first illumination level of the information support medium. Thus, between these time intervals, the illumination level may change without having an influence on the operation of the loop for controlling track following. By way of non limiting example, in so far as the circuit of FIG. 2 is concerned, the signal applied to input E may assume two values which correspond to the creation of an alteration or to conservation of the unrecorded state of the track. This signal is available at the input of a control circuit 102 which may be formed by a threshold comparator circuit 9 which receives this signal at its inverting input and at its other input a reference voltage Vref included between the two values to be differentiated. The output of comparator 9 is connected to one of the inputs of an AND gate 10 which receives at its other input a clock signal H. This clock signal supplies pulses for controlling the taking of samples from the signal delivered by the photodetecting means 6. To this end, the AND gate 10 has its output connected to the control input of the sampling means 11. As long as the electric signal at input E remains less than the voltage Vref, the output of comparator 9 is at a level which allows the circuit signal H, required for controlling the samples taken by the sampling means 11, to pass through the AND gate 10.

Figure 3:
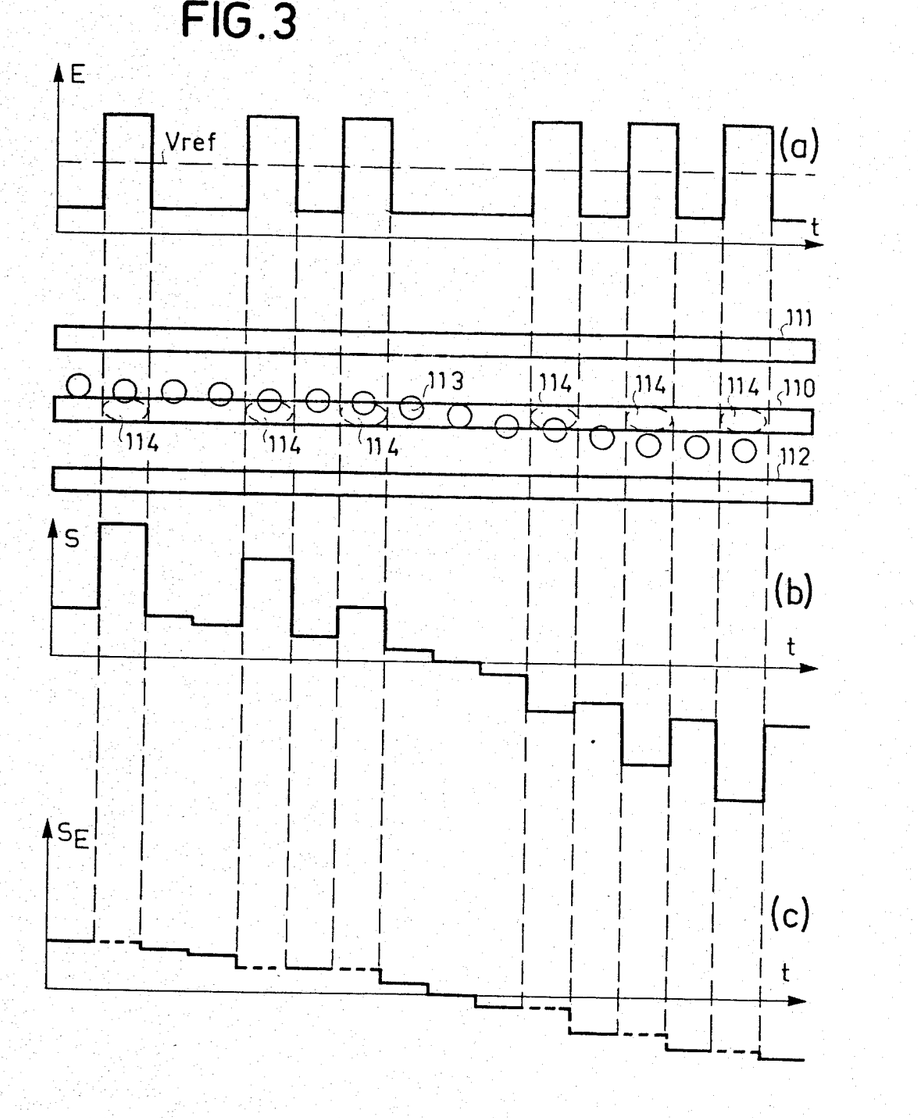
FIGS. 3 and 4 are explanatory diagrams.

The different signals present are shown in FIG. 3. It is assumed that the signal at the output of the photodetecting means 6 contains a component for showing a deviation from track following. In FIG. 3 at "b" is shown, with respect to time, the signal S at the output of the photodetecting means 6 and simultaneously there is shown in FIG. 3 at "a" a signal applied to input E where writing phases corresponding to overshooting of threshold Vref alternate with intervening phases where the amplitude of signal E is short of the threshold. Below diagram (a) there is shown three adjacent track portions 110, 111, and 112 and the successive positions of the light spot 113 while exaggerating the track following deviations. The writing zones on the track element 110 are shown symbolically by zones 114 which correspond to periods during which the threshold Vref is exceeded by signal E. Signal $S_E$ delivered by the sampling means 11 is a succession of samples represented at "c" in FIG. 3. It will be noted that the frequency of the clock signal H is equal to the chopping frequency of signal E illustrated at "a", but this frequency could be higher so as to take more samples. For good reconstitution of the track following deviation signal, at least two samples must be taken for the highest frequency contained in this wave shape. The reconstitution of the track following deviation signal may be made by means of a low-pass filter 17 disposed between the sampling means 11 and the servo-control circuit 7.

In FIG. 3, it can be seen that signal $S_E$ shown at (c) is formed from continuous line portions occupying the time intervals where the signal E is less than the threshold Vref. These portions are in themselves sufficient to provide after smoothing satisfactory reproduction of the position of the light spot 113 with respect to the track element 110. FIG. 3 shows that continuous reproduction may be obtained by using sample and hold circuit means whose function is to take the sample and store its value until the next sample is taken. This new aspect of the invention is illustrated in the curve representative of signal $S_E$ by broken line portions which extend the continuous line portion which precedes them.

The diagrams of FIG. 3 refer to the case of a digital type transcribed signal. The voltage Vref is advantageously between the two voltage levels respectively required for transcribing one and the other state of a digital word.

Instead of using all the uninscribed areas available as sampling windows, there may apriori be adopted on the information support medium an arrangement of writing blocks alternating with unrecorded or blank areas sufficiently close together for correctly detecting the trend of the track following deviations.

Figure 4:
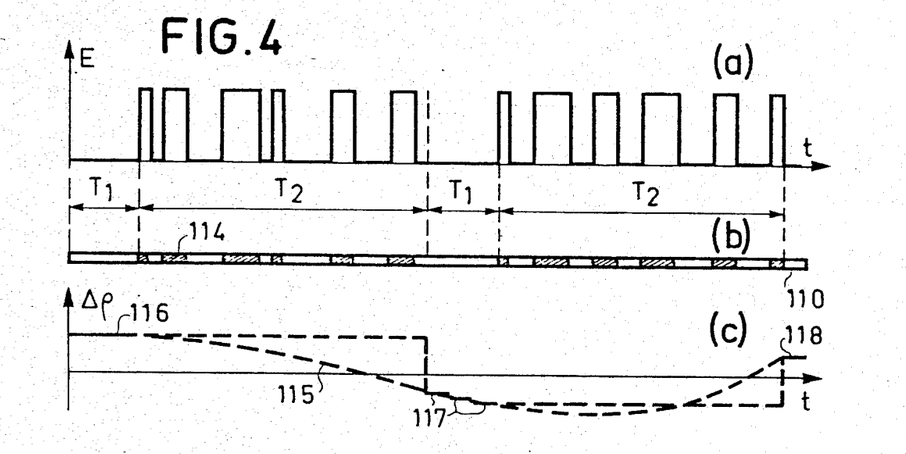

FIG. 4 shows at (a) a block arrangement of signal E to be recorded. The writing phases have a duration $T_2$ and they are separated by areas of duration $T_1$ especially intended for detecting deviations from track following. The track element 110 shown at (b) in FIG. 4 can only be recorded by zones in the areas corresponding to the duration $T_2$. The diagram shown at (c) in FIG. 4 gives the track following deviation $\Delta p$ with respect to time. Curve 115 shows the development of the deviation Δp. The parts 116, 117 and 118 represent the samples taken during the non writable phases of duration ion $T_1$. The locating of areas $T_1$ is made by means of a flag or by any other appropriate means. The staircase plot which follows each sampling represents conservation of the sample in the store. In some track following deviation detection cases, it may be necessary to provide several samplings between two successive writing phases.

Up to now it has been assumed that the loop which achieves track following is disturbed by light intensity changes required by writing the information along a track.

Figure 5:
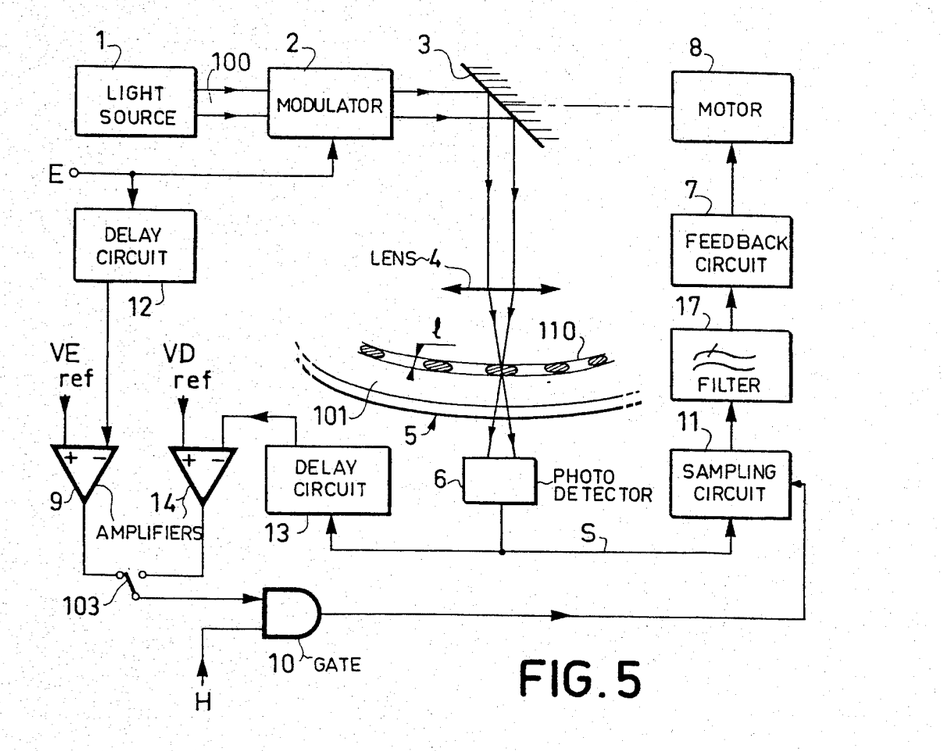
FIG. 5 shows a first variation of the device of the invention.

Another form of disturbance may be generated in a reading phase with constant illumination level. In fact, there may be formed along a pre-recorded track zones having interaction such, with a reading beam, that the detection signal losses a part of the pre-engraved contrast and may go as far as reversing it. This cannot fail to disturb the operation of the track following device. In this case, the invention provides controlling the sample-taking from the detected signal. This is why, according to another variation of the device of the invention shown in FIG. 5, the device comprises two threshold comparator circuits 9 and 14. The first comparator 9 allows, as before, comparison on the input signal E whereas the second comparator 14 allows comparison on the signal S available at the output of the photodetecting means 6. The signals from comparators 9 and 14 are switched by a switch 103 depending on the operating mode selected. The signal selected by switch 103 is applied to one of the inputs of AND gate 10 so as to allow clock signal H to pass therethrough. To compensate for the different delays and allow the signals at the input of the AND gate 10 to be placed in coincidence, the input signal E passes through a delay circuit 12 then is compared with the voltage VEref in the threshold comparator 9, whereas the signal supplied at the output of the photodetecting means 6 passes through a delay circuit 13 then is compared with a voltage VDref in comparator 14. The signal from the sampling means 11 is smoothed and reconstituted after passing through a low-pass filter 17. A device in accordance with the invention, such as decribed and shown in FIG. 5, once the reference voltages VEref and VDref and the delay circuits 12 and 13 have been judiciously chosen, allows the feed-back loop to operate free from any disturbing phenomenon due to the sudden variations of light intensity of the illumination beam or to the fluctuations produced by certain passages of the track during reading.

Figure 6:
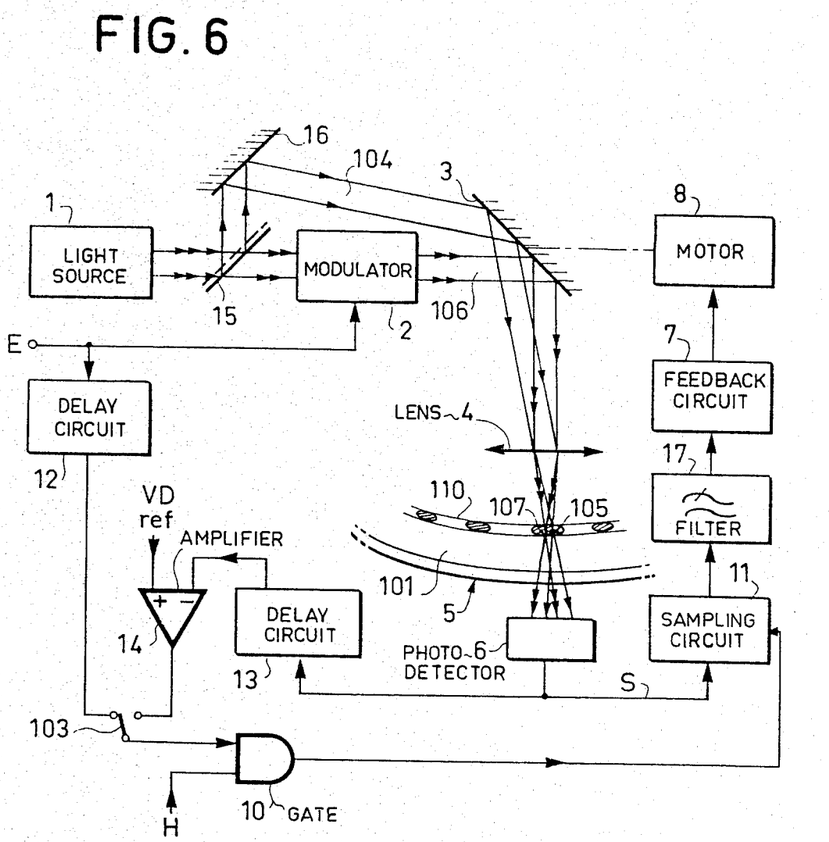
FIG. 6 shows a second variation of the device of the invention.

With a proper choice of the code used for coding the digital words, these latter may be represented with two states without needing to resort to identification intervals between words. Thus, we may have at the output of modulator 2 two light intensities. It is then advantageous to adopt a device such as shown in FIG. 6, in which device the beam from the radiation source 1 is divided into two beams, for example by means of a semi-transparent plate 15, a beam of low light intensity 104 or pilot beam and a beam of high light intensity 106 or transcription beam. The two beams are focussed by lens 4 on the reference surface 101 so as to illuminate the support medium 5 by means of two spots following one another along the pre-engraved track 110. The rays collected by the photodetecting means 6 from the two light spots may create disturbances in the electric signal delivered. These disturbances are eliminated by sampling in accordance with the invention. The intensity of the pilot beam 104 is for example 25% of the intensity supplied by the beam from radiation source 1. The pilot beam 104, after being deflected a first time by the semi-transparent plate 15, is deflected a second time by an auxiliary mirror 16. After deflection by the deflecting means 3, it is in a direction slightly oblique with respect to the writing beam in front of lens 4. The pilot beam 104, after focussing by lens 4 on the reference surface 101, gives a spot 105 having a low intensity level and allowing transcription from the information support medium 5 and following of the track. The transcription beam 106 gives a more intense light spot 107. The signal present at the input terminal E may have two states, i.e. a first state for ordering the modulator 2 to let the transcription beam 106 pass through and a second state for ordering the modulator 2 to cut off said beam. A modulator 2 of this all or nothing operating type is easy to produce and easy to use. Since the signal present at the input terminal E is digital, it may be applied directly to the input of the AND gate 10, via switch 103, without requiring a voltage comparator circuit. To compensate for the different delays it proves necessary to insert a delay circuit 12 between the input terminal E and the AND gate 10.

Figure 7:
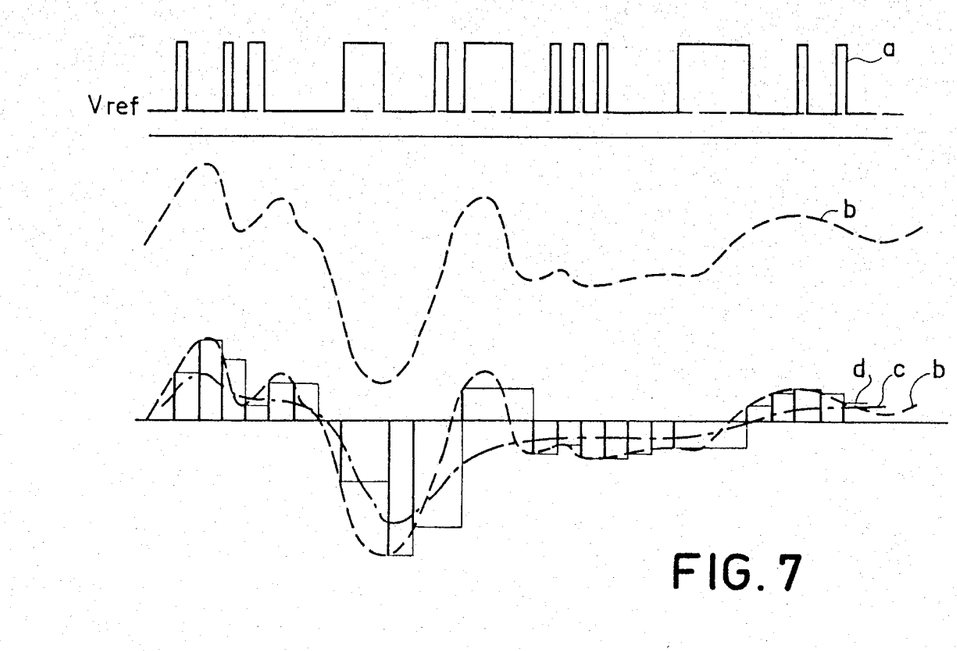
FIG. 7 shows a set of explanatory diagrams.

Up to now it has been assumed that the number of samples taken was sufficient to guarantee good reconstitution of the wave shape after smoothing by the low-pass filter 17. In addition, this implies that the duration of sample-taking and the time separating two successive samples are substantially constant. To guarantee better track following by means of samples which, considering the signal at the input terminal E, have a variable periodicity, the present invention provides storage means which cooperate with the sampling means 11 to store the value of a sample until the appearance of the next sample. The storing means and the sampling means are advantageously formed by a sample and hold circuit in which the signal available at the output passes through the low-pass filter 17 before being applied to the feed-back loop. Thus, in FIG. 7, these different signals are shown; signal at the input E at (a), signal S supplied by the photodetecting means 6 at (b) and signal at the output of the sample and hold circuit at (d). The signal at the output of the sample and hold circuit is more faithful than the signal represented at (c) and which corresponds to simple filtering, as can be seen in FIG. 7. The use of a sample and hold circuit considerably improves the signal/noise ratio.

Figure 8:
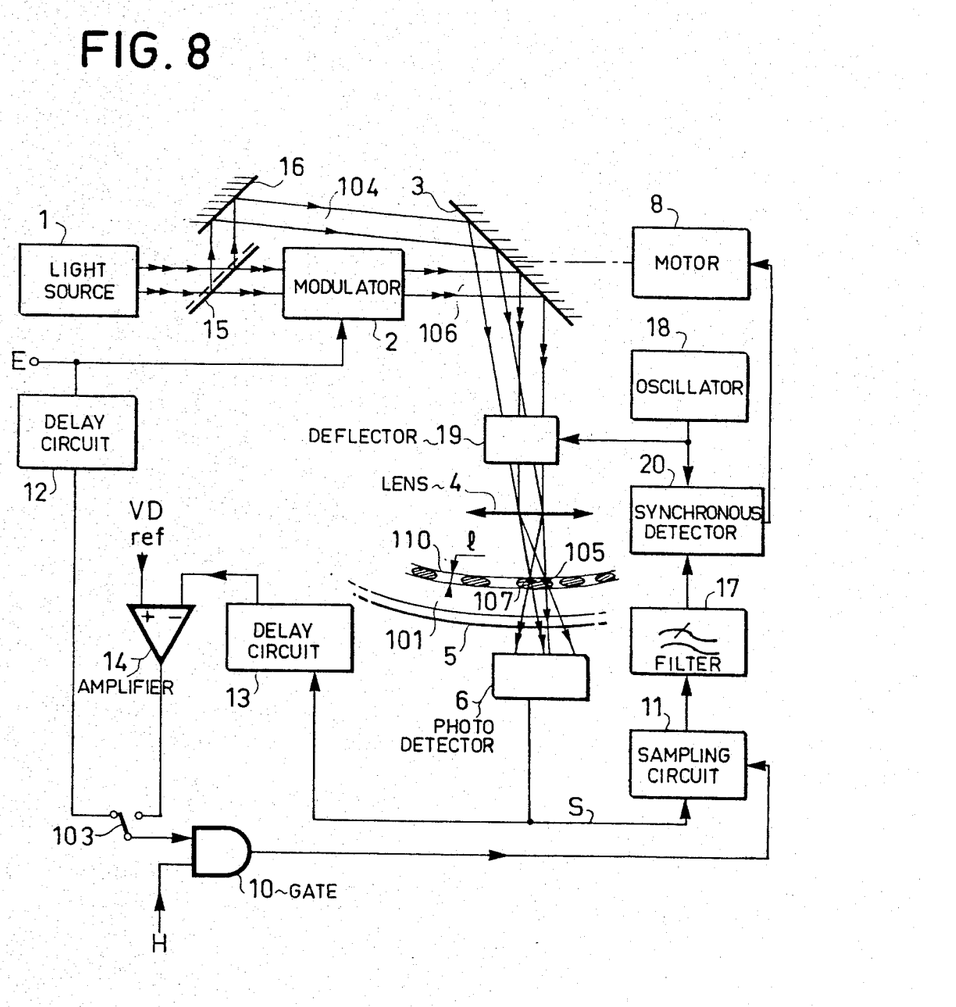
FIG. 8 represents a third variation of the device of the invention.

According to a variation of the invention, FIG. 8 represents a device in which track following uses a detection technique based on wobbulation. In the following description, only the feed-back loop will be explained, so as to better understand how the invention cooperates with a wobbulation device. A circuit such as shown in FIG. 8 comprises a local oscillator 18 which supplies an alternating signal at its output which is applied to the input of an auxiliary deflector means 19 and to one of the inputs of a synchronous detector 20. In accordance with SHANNON's theorem, the frequency of the local oscillator 18 is chosen less than half the clock frequency H. The auxiliary deflector means 19 is disposed with lens 4 and, in the case shown in FIG. 8, the pilot beam 104 and the transcription beam 106 pass therethrough. This auxiliary deflector means 19 may, for example, be an acousto-optical deflecting cell which serves for impressing on the light spots 105, 107 a radial movement at a frequency of the local oscillator 18. The synchronous detector 20 receives at one of its inputs the signal supplied by the local oscillator 18 and, at the other input, the signal from the photodetecting means 6 after having been sampled-stored by the sample and hold circuit means 11 and smoothed by the low-pass filter 17. Motor 18, acting on the deflection means 3, is controlled by the synchronous detector 20 so as to correct any error in scanning the track.

The invention described by way of illustration is in no wise limiting and applies thus to mono-spot as well as multi-spot devices, and with track following devices using or not using wobbulation detection techniques.

What is claimed is:

1. A tracking device for use in an optical data transcription system, said system including a data storage medium for storing data and having a reference surface wherein a set of radially adjacent track elements are pre-engraved, said tracking device causing an illuminating spot to selectively follow any one of said adjacent track elements, said illuminating spot corresponding to an area of impact of a focussed beam of radiant energy impinging on said reference surface, said tracking device comprising:

actuator means for displacing said illuminating spot transversely of said radially adjacent track elements;

photodetector means sensing the radiant energy emerging from said area of impact for generating from optical interaction with a scanned one of said radially adjacent track elements a signal representative of the error of tracking of said illuminating spot in relation with the radial axis of said scanned one track element; and feedback loop means for controlling said actuator means with said signal, said feedback loop means including means for blanking out the transmission of the values taken by said signal while scanning non-contiguous portions, of said scanned one track element, respectively allotted for post recording of said data, thereby preventing unreliable control of said actuator means arising from the scanning of said non-contiguous portions, each of said radially adjacent track elements being provided with gaps, intermediate said non-contiguous portions, having pre-engraved tracking items.

2. The tracking device as claimed in claim 1, further comprising a means for periodic displacement of said spot across said scanned one track element, a local oscillator for controlling said periodic displacement means, a synchronous detector controlled by said local oscillator for receiving the signal produced by said photo-detecting means and auxiliary deflecting means for displacing said spot; said sampling means being inserted between said photo-detecting means and said synchronous detector; the sampling frequency being at least double the frequency of said local oscillator.

3. The tracking device of claim 1, wherein said means for blanking out comprises sampling means controlled for selective transmission of said signal to said actuator means when a command signal is less than a reference threshold.

4. The tracking device of claim 3, wherein said command signal exceeds said reference threshold when reading out said post recorded data.

5. The tracking device of claim 4, wherein said sampling means comprises sample and hold circuitry.

6. The tracking device of claim 3, wherein said command signal exceeds said reference threshold when post recording said data.

7. The tracking device of claim 6, wherein said sampling means comprises sample and hold circuitry.

8. The tracking device of claim 3, wherein said sampling means comprises sample and hold circuitry.

9. The tracking device of claim 3, further comprising a synchronous detection means, said sampling means being connected to a first input of said synchronous detection means, said synchronous detection means having a further input receiving an a.c. waveform and an output controlling said actuator means, said sampling means having an input connected to said photodetector means, the frequency of said a.c. waveform being less than half the sample taking frequency of said sampling means.

10. The tracking device of claim 9, wherein said a.c. waveform is also fed to said actuator means.

11. The tracking device of claim 3, wherein a plurality of samples are taken by said sampling means within the time of scanning of one of said gaps.

12. An optical data transcription system comprising:

a data storage medium for storing data and having a reference surface wherein a set of radially adjacent track elements are pre-engraved;

optical radiation source means arranged for generating first and second beams, respectively, forming in said reference surface two scanning spots defining an area of impact on said reference surface, said two scanning spots being spaced from one another along one of said pre-engraved track elements, one of said beams being optically modulated by said data and the other one of said beams being a locating beam; and a tracking device for causing said two scanning spots to selectively follow any one of said adjacent track elements, said tracking device comprising actuator means for displacing said two spots transversely of said adjacent track elements, photodetector means sensing radiant energy emerging from said area of impact for generating from optical interaction with a scanned one of said radially adjacent track elements a signal representative of the error of tracking of said two spots in relation with the radial axis of said one track element, and feedback loop means for controlling said actuator means with said signal, said feedback loop means including means for blanking out the transmission of the values taken by said signal while scanning non-contiguous portions of said track elements respectively allotted to post recording of said data, thereby preventing unreliable control of said actuator means arising from the scanning of said non-contiguous portions, said radially adjacent track elements being provided with gaps intermediate said non-contiguous portions having preengraved tracking items.

13. An optical transcription system as claimed in claim 12, wherein postrecorded data stored in said data storage medium are digital data.

14. An optical transcription system as claimed in claim 13, wherein said digital data are grouped in said allotted non-contiguous portions.

15. An optical transcription system as claimed in claim 12, wherein non writable areas along said radially adjacent track elements are located using flag means for delineation of said gaps.

* * * * *